United States Patent [19]

Bauch et al.

[11] 4,114,107

[45] Sep. 12, 1978

[54] REMOTELY FED INTERMEDIATE AMPLIFIER FOR COMMUNICATION LINES

[75] Inventors: Helmut Bauch, Starnberg; Karl Heinz Möhrmann; Frithjof Koppehele, both of Munich, all of Germany

[73] Assignee: Siemens Aktiengesellschaft, Berlin & Munich, Germany

[21] Appl. No.: 795,706

[22] Filed: May 11, 1977

[30] Foreign Application Priority Data

May 25, 1976 [DE] Fed. Rep. of Germany ....... 2623412

[51] Int. Cl.² ............................................. H03F 3/60
[52] U.S. Cl. ..................................... 330/56; 330/165
[58] Field of Search ................ 330/56, 165, 286, 287, 330/297, 302, 310; 178/70 R; 179/170 R

[56] References Cited

FOREIGN PATENT DOCUMENTS 2,355,014 5/1974 Fed. Rep. of Germany ............. 330/56
6,503,572 9/1966 Netherlands .............................. 330/302

Primary Examiner—James B. Mullins
Attorney, Agent, or Firm—Hill, Gross, Simpson, Van Santen, Steadman, Chiara & Simpson

[57] ABSTRACT

An intermediate amplifier arrangement for communication lines in which the intermediate amplifier is divided into at least two partial amplifiers each having a capacitance between the outer conductor of the coaxial transmission line and the amplifier and connected to feed supply voltages such that the amplifiers are uncoupled from each other as to high frequency and utilizing low inductance and low resonance capacitors so as to obtain very low power consumption and large cyclical attenuation.

12 Claims, 7 Drawing Figures

REMOTELY FED INTERMEDIATE AMPLIFIER FOR COMMUNICATION LINES

BACKGROUND OF THE INVENTION

1. Field of the Invention

This invention relates in general to intermediate amplifiers for transmission lines of the coaxial type.

2. Description of the Prior Art

Remotely fed intermediate amplifiers are required in coaxial lines between input and output connections to the coaxial line and the outer conductor of the coaxial conductor of the input and output line are connected together and a supply voltage is supplied to the intermediate amplifier and a capacitor is arranged between the outer conductor of the coaxial lines and the intermediate amplifier. An intermediate amplifier of this type is described in German Auslegeschrift No. 1,940,517.

At amplifier points for wide band transmission systems, for example, carrier frequency line amplifiers, such amplifiers must be remotely fed in series with direct current through the inner conductors of the coaxial cables and the amplifier reference potentials are the direct current potential of the inner conductors of the coaxial cable and cannot, therefore, be directly connected to the outer conductors of the coaxial cable. Generally, a housing is provided to which the grounded outer conductors of the coaxial cables are connected. Between the amplifier reference potential and the housing, there must be a low ohmic alternating current connection in the frequency range of the transmission band of the coaxial cable which connection is made by means of a blocking capacitor.

FIG. 1 illustrates an arrangement of prior art remote amplifiers using a simple shunt circuit for a remotely fed intermediate amplifier 1 which receives direct current and is series fed. The direct current supply flows through the inner conductor of the coaxial cable 21 or alternatively through the coaxial cable 22 and passes around the remotely fed amplifier 1 through inductive chokes 51 and 52 as shown and is used to supply the amplifier feed voltage U. The junction point X between the chokes 51 and 52 is at zero potential with regards to AC voltage and is connected to the outer conductor Y of the coaxial cables 21 and 22 through the capacitor 3 for this type of remote feed. The capacitor 3 must have a high voltage electrical strength of, for example, several thousand volts since a substantial voltage differential can occur between the inner and outer conductors of the coaxial cable and this capacitor must not be destroyed if overvoltages occur such as a result from electrical storms and other factors.

To obtain the high voltage breakdown resistance of the capacitor produces a number of problems. For example, due to the high voltage breakdown strength it must be of a certain minimum size which causes self-inductance which is not negligible at high frequencies as well as this produces parallel resonance at certain frequencies. Alternating currents $i_A$ in the output circuit must flow through capacitor 3 and such current causes a voltage drop $U_C$ across the capacitor if the impedance of the capacitor 3 is not negligibly small. Such voltage in turn causes a current $i_E$ in the input circuit which comprises a feedback that takes place from the output to the input. This can cause instability or at least changes in the frequency response curve of the amplifier 1 which is very undesirable.

Therefore, because of the particular design of the capacitor 3, measures must be taken so as to achieve a sufficiently high cyclical attenuation or in other words a sufficiently small feedback between the output and the input. A capacitor especially designed for this purpose, has been described in German Auslegeschrift No. 1,940,517.

If for compensating the amplifier field attenuation, it is required that the amplifier 3 have an especially high amplification in a certain specific frequency range near the upper band limit, it can occur that the necessary cyclical attenuation can no longer be achieved even when using a special type capacitor. Also, it is not feasible to connect several identical or different capacitors in parallel since parallel resonances can occur in amplifier arrangements, if individual elements act inductively at certain frequencies but others are still capacitive and, thus, undesirable effects can occur.

It is also possible to provide a voltage transformer in the feed supply direct current path with the output of the transformer electrically separated from its input so that the reference potential of the intermediate frequency amplifier can be directly connected to the outer conductor of the coaxial cable and a capacitor is not required in such arrangement. See, for example, German Offenlegungsschrift No. 2,355,014. In such arrangement, a special current supply device is required for each intermediate amplifier. In addition to the lack of reliability and expense for the components of such arrangement, in addition a current supply of this type has the disadvantage that its efficiency is limited so that feed supply energy is lost and heat is generated.

SUMMARY OF THE INVENTION

It is, therefore, an object of the invention to achieve the desired large cyclical attenuation and intermediate amplifiers in which blocking capacitors are provided between the reference potential and the outer conductor connection to the coaxial cables.

So as to accomplish this objective, rather than a single intermediate amplifier, at least two partial sub-amplifiers each having their own capacitances between the reference potential and the outer conductor connection of the coaxial cable and wherein the feed supply voltage inputs to the partial sub-amplifiers are decoupled from each other as regards high frequency energy. Particularly low inductance and low resonance capacitors are used as the capacitors. The resulting intermediate amplifier is preferably a high frequency or a carrier frequency amplifier of large band width or a regenerative amplifier or a regenerator of a PCM system.

The invention results in a very large cyclical attenuation with very low power consumption.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
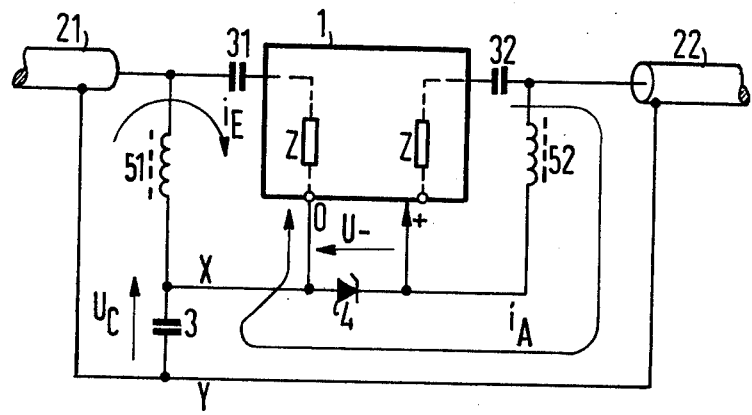
FIG. 1 is a diagram illustrating a prior art simple shunt circuit for a remotely fed intermediate amplifier.

In the prior art system according to FIG. 1, the outer conductors of the input and output coaxial cables 21 and 22 are connected together by conductor Y. The amplifier 1 is coupled through the capacitor 31 to the inner conductor of the coaxial cable 21. An inductive choke 51 and a capacitor 3 are connected between the outer conductor Y and the inner conductor of coaxial cable 21. A capacitor 32 is connected between the output of the amplifier 1 and the inner conductor of the coaxial cable 22. An inductive choke 52 is connected from the inner conductor of the coaxial cable 22 to a positive feed point of the amplifier 1 and to a Zener diode 5 which has its other side connected to the second zero feed point of the amplifier 1 and to the connection point X between the choke 51 and the capacitor 3.

Figure 2:
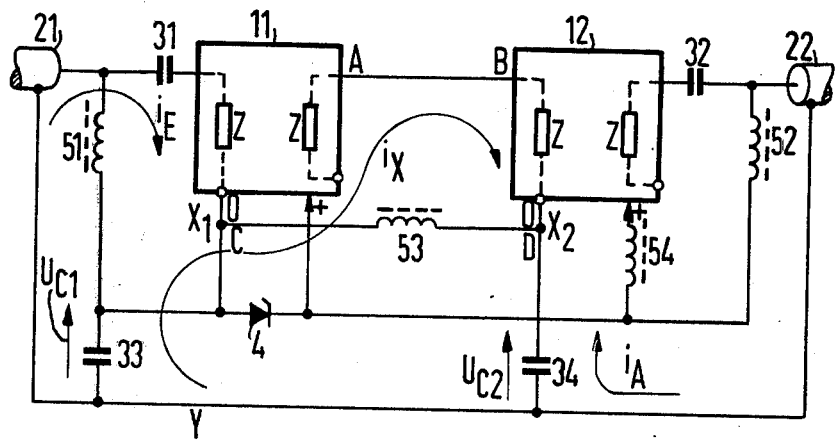
FIG. 2 illustrates an intermediate amplifier of the invention which is composed of two partial sub-amplifiers.

In FIG. 2, the amplifier of the prior art has been divided into two partial sub-amplifiers 11 and 12. The outer conductors of the input and output coaxial cables 21 and 22 are connected together by the conductor Y. The first partial sub-amplifier 11 has its input connected through the capacitor 31 to the inner conductor of coaxial cable 21. An inductive choke 51 is connected from the inner conductor of coaxial cable 21 to a capacitor 33 which has its other side connected to conductor Y. The zero feed point of the amplifier 11 is connected to point $X_1$ and to the junction point between the choke 51 and capacitor 33. A Zener diode 4 is connected between point $X_1$ and the second plus input of the amplifier 11. The second partial amplifier 12 has its input B connected to the output A of the amplifier 11. The zero input point D, $X_2$ is connected to a capacitor 34 which has its other side connected to conductor Y. An inductive choke 53 is connected between point $X_1$ and $X_2$. The plus input to amplifier 12 is connected to a choke 54 which has its other side connected to the plus input of amplifier 11 and to an inductive choke 52 which has its other side connected to the junction point between the inner conductor of coaxial cable 22 and a capacitor 32 which is connected to the output of amplifier 12.

In the circuit of FIG. 2, the outer conductors of the coaxial cables 21 and 22 are directly connected to each other by conductor Y but the inner conductors of the coaxial cables each have a current supply shunt connected to them which separates the communication transmission band which does not go down to DC from the feed supply direct current.

In the partial sub-amplifiers 11 and 12, the zero potentials C and D of the two amplifiers are connected together by the inductive choke 53 and the plus terminals are connected together through the inductive choke 54 and, thus, as far as direct current is concerned, the feed supply voltage inputs are connected in parallel.

Inductive choke 54 can be replaced by a choke connected between the Zener diode 4 and choke 52 if desired and the zero and plus terminals of the two amplifiers will still be connected in parallel for DC currents and isolated from each other for AC currents. In a further modification of the arrangement shown in FIG. 2, the sub-partial amplifier 12 can be directly fed and sub-partial amplifier 11 can be fed through chokes.

The supply feeding direct current through the inner conductors of the coaxial cables causes a voltage drop which is the feed supply direct current voltage at the parallel connected of the load resistances formed by the partial sub-amplifiers and which operate at the feed supply inputs and these are not specifically illustrated in the FIGS. 2. The Zener diode 4 is parallel to the feed supply input of the partial sub-amplifier 11 but such Zener diode is not absolutely necessary and expediently will have a Zener diode voltage which is somewhat higher than the feed supply direct voltage so that it normally does not conduct current and merely has a voltage limiting effect. If necessary, however, it can also serve as a voltage source which generates a constant direct voltage from the feed supply current.

The zero feed supply terminal C of partial sub-amplifier 11 is connected to the capacitor 33 to the outer conductors of the coaxial cables comprising the conductor Y so as to close the input circuit with regard to alternating currents. The feed supply input D of partial sub-amplifier 12 is coupled through capacitor 34 to conductor Y which is connected to the outer conductors of coaxial cables 21 and 22 so as to close the output circuit with regard to alternating currents.

The input and output impedance of sub-partial amplifiers 11 and 12, respectively, have impedance values of Z and at least with regard to alternating currents are unipolar relative to reference potential 0 at terminals C and D.

Currents $i_A$ in the output circuit flows through capacitor 34 and generates a voltage $U_{C2}$ across the capacitor. This voltage causes a current $i_X$ which flows through capacitor 33 and generates a current $i_E$ in the input circuit. Voltage $U_{C2}$ is, however, not supplied completely across capacitor 33 but is supplied through a voltage divider which is formed by the capacitor 33, the input impedance of the sub-partial amplifier 12 and the output impedance of partial sub-amplifier 11. This causes the cyclical attenuation to be greatly increased which is very desirable.

The cyclical attenuation can be still further increased if the high frequency path or respectively the signal path between the sub-partial amplifiers 11 and 12 is constructed as a line choke.

Figure 3:
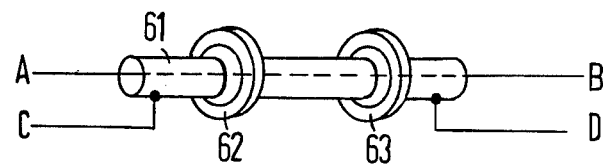
FIG. 3 illustrates a line choke.
Figure 4:
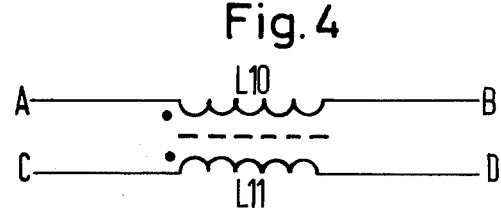
FIG. 4 is an equivalent circuit diagram for the line choke of FIG. 3.

Such a line choke is illustrated in FIG. 3 and comprises a coaxial cable 61 with ferrite rings 62 and 63 formed around it. Other than parasitic effects, no attenuation of the transmission path is caused by the line choke. FIG. 4 is an equivalent circuit of the line choke illustrated in FIG. 3 and comprises the inductances L10 and L11 connected between the input and output inner conductors A and B and the inductor L11 connected between the outer conductor. The windings are wound in the same direction so that the signal currents to be transmitted generate oppositely directed magnetic fields which cancel each other in both windings. For currents in the same direction B–A, D–C the arrangement acts as a high frequency choke. The line choke makes the connection of terminals C and D through the outer conductors so that the choke 53 can be dispensed with, with this arrangement. The other necessary inductances can be selected as ferrite rings or beads if desired.

Figure 5:
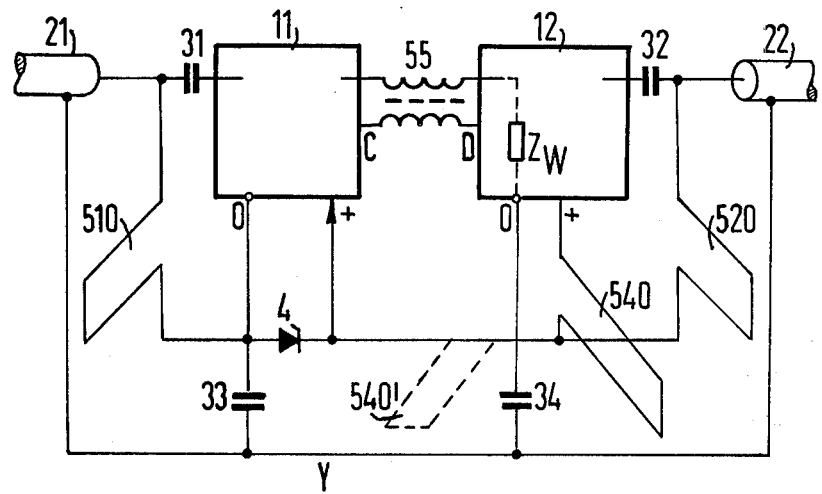
FIG. 5 illustrates a modification of the invention comprising two partial sub-amplifiers and using short circuited lines in the current supply arrangement.

In the event very wide transmission band is to be used, the use of output side short-circuited coaxial lines or respectively stub lines which are short-circuited on the output can be used instead of inductors or chokes. An embodiment using quarter wave stubs is illustrated in FIG. 5. A quarter wave stub line at or above the upper limiting frequency 510 replaces the choke 51. A quarter wave stub line 520 replaces choke 52 and a parallel stub line 540 replaces the choke 54. Alternatively, rather than the parallel stub line 540, a serial stub line 540' shown in dotted line can be utilized where shown in FIG. 5 rather than the stub line 540 if desired. Line choke 55 which is in the high frequency signal transmission path between the sub-partial amplifiers 11 and 12 is connected between connection points C and D.

In the design structure, particular attention must be paid to assure that direct couplings between the input and output are avoided. A ground connection between the partial amplifiers 11 and 12 may only be accomplished through the connection Y of the cable outer conductors.

Figure 6:
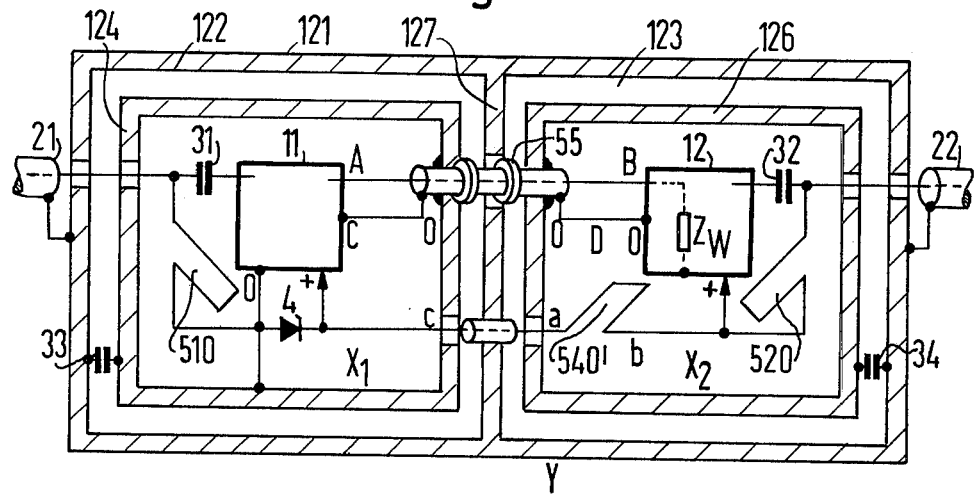
FIG. 6 is a sectional view through an intermediate amplifier using two partial sub-amplifiers mounted in housings.

FIG. 6 illustrates an embodiment for accomplishing this in a particularly advantageous manner by an arrangement of partial sub-amplifiers 11 and 12 mounted in separate chambers of a housing 121 which has chambers 122 and 123 and the amplifiers 11 and 12 are mounted in interior housings 124 and 126, respectively, mounted in chambers 122 and 123. The wall 127 of housing 121 separates the housings 124 and 126. The outer cnductor of input line 21 is connected to the wall of housing 121. The external conductor of output coaxial cable 22 is also connected to the wall of housing 121. Suitable insulation must be provided either by air space or otherwise between the walls of the housings 124 and 126 and the outer housing 121 and the capacitors 33 and 34 are respectively mounted between the housing 121 and the housings 124 and 126. The inner chamber of housing 121 is designated as $X_1$ and the inner chamber walls of housing 124 are designated as $X_2$.

In the intermediate amplifier illustrated in FIG. 6 in which the sub-partial amplifiers 11 and 12 are accommodated in separate chambers for the purpose of decoupling the high voltage capacitors, the outer chamber is provided which is a total shield of the line amplifier and is connected to the outer conductors of the incoming and the outgoing coaxial cables 21 and 22. The partial amplifier 11 is mounted in the inner partial chamber 124 and the partial amplifier 12 is mounted in the inner partial chamber 126. The arrangement illustrated in FIG. 6 has the additional advantage that the capacitors 33 and 34 can at least partially be formed by the capacitances between the chamber walls and chamber floors of the inter-nested chambers 121, 124 and 126.

The inductance 53 illustrated in FIG. 2 or, respectively, the line 540' illustrated in FIGS. 5 and 6 can be arranged in one or the other of the inner chambers 124 or 126 or can also be between the chambers. The passing through of the line which is choked by the stub line 540' passes through the inner chamber walls "a", "c" must be a decapacitive connection at least with regard to the wall of the inner chamber in which the stub line or choke is mounted whereas on the other hand the passing through the outer chamber walls must have a high capacitance for decoupling and is preferably formed as a high electrical strength tubular capacitor.

The chokes illustrated in FIGS. 5 and 6 which are accomplished with the use of short-circuited lines requires that attention must be given when coaxial lines are used that the inner and outer conductors are connected on the right side.

For example, in the case of line 540', the outer conductor must not be connected to the line leading through the inner wall "a" since the outer conductor has a relatively large stray capacitance relative to the inner chamber $X_2$ which would bridge the stub line 540'.

If no line choke 55 is provided then the ground connection C-D is also provided with a choke coil and the connection A-B is accomplished in a non-capacitance manner.

In the sample embodiments illustrated in FIGS. 2, 5 and 6, a parallel supply feed of the partial sub-amplifiers 11 and 12 is provided. In the sample embodiment illustrated in FIG. 7, on the other hand, a series supply feed is provided. In the sample embodiment illustrated in FIG. 7, partial sub-amplifiers 11 and 12 are mounted in a chamber system similar to that illustrated in FIG. 6, but the arrangement is different from that in FIG. 6 in that the partial sub-amplifiers 11 and 12 are not connected in parallel with their supply voltage inputs but rather in series and for this purpose a Zener diode 41 and a Zener diode 42 is connected in parallel to each of the two supply voltage inputs. The series connection of the two supply voltage inputs is made through the outer conductor of the line choke 55. This outer conductor is connected to the inner chamber in which the partial sub-amplifier 12 is mounted but in the other chamber $X_1$ it is insulated from the inner chamber of partial sub-amplifier 11. The line choke 55 also passes through in an insulated manner through the partition 127 between the two outer chambers formed in housing 121. Between each of the two inner chambers $X_1$ and $X_2$ and the outer chamber partition 127, ferrite cores 55 are in each case mounted on the coaxial line which connects the output of partial sub-amplifier 11 to the input of partial sub-amplifier 12.

Figure 7:
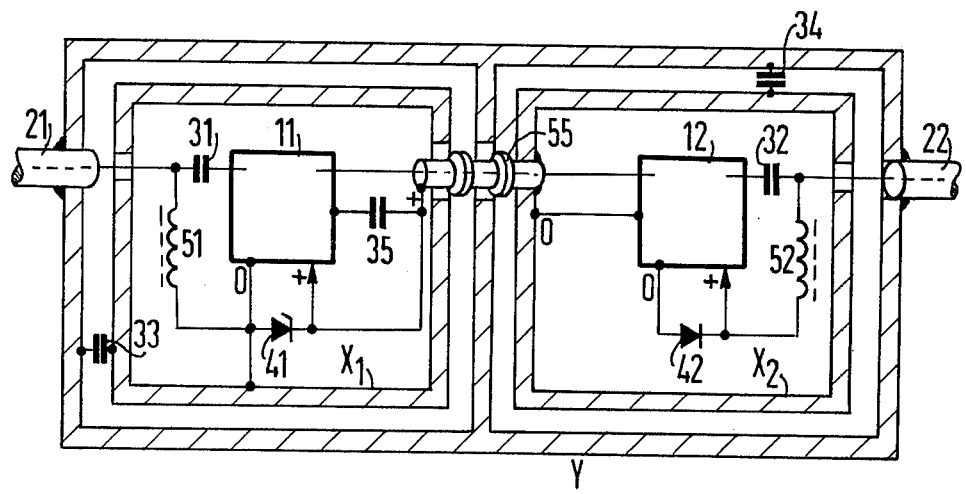
FIG. 7 is a further modification of the invention illustrating the two partial sub-amplifiers connected in series and mounted in housing.

The series feed supply illustrated in FIG. 7 does produce a total higher voltage drop, but it has the advantage that no additional feed through passage for the direct current is necessary which can flow through the line choke in FIG. 7. It is to be realized, of course, however, that the direct current can be transmitted through a separate choked line instead of through a line choke.

In the description of FIGS. 1, 2, 5, 6 and 7, it has been assumed that the operating voltage terminals of the sub-partial amplifiers designated with zero and plus are capacitively connected together. The output circuit of partial sub-amplifier 11 is isolated as far as AC currents by means of the corresponding blocking capacitor 35.

The division and decoupling described with the aid of the sample embodiments may be used in a corresponding fashion on more than two stages with a suitable embodiment using input and output stages capacitors 31 and/or 32 can be eliminated.

Although the invention has been described with respect to preferred embodiments, it is not to be so limited, as changes and modifications may be made which are within the full intended scope as defined by the appended claims.

We claim as our invention:

1. A remotely-fed intermediate amplifier, especially for coaxial communication lines in which said amplifier is arranged between an input line and an output line which have their outer conductors electrically connected together and said intermediate amplifier, said outer conductors and a supply voltage connection have the same alternating voltage reference potential and are capacitively connected, and wherein said amplifier comprises at least two sub-partial amplifiers (11, 12), having first and second input terminals, a pair of capacitors (33, 34) each connected with one side to said outer conductors, a first one of said pair of capacitors having its other side connected to the first input terminal of a first one of said pair of partial amplifiers, a second one of said pair of capacitors having its other side connected to the first input terminal of a second one of said pair of partial amplifiers, and said first and second input terminals (0, +) of said two sub-partial amplifiers (11, 12) decoupled from each other relative to high frequency currents.

2. An intermediate amplifier according to claim 1 wherein said sub-partial amplifiers (11, 12) are parallel fed such that one of the sub-partial amplifiers (11) has a supply source directly applied to its first and second input terminals and at least one further sub-partial amplifier (12) with its first and second input terminals connected respectively through a pair of inductors (53, 54) to the first and second input terminals of said one amplifier (11).

3. An intermediate amplifier according to claim 1, wherein at least one line choke (55) is mounted for connecting two successive sub-partial amplifiers (11, 12) and the reference potential (0) is fed to one of the two sub-partial amplifiers (12) through the line choke (55) mounted in the high fequency signal transmission path, and the other potential (+) of the supply voltage is fed through an inductor (540).

4. An intermediate amplifier according to claim 1, wherein inner conductors of said input and output lines are respectively connected through a pair of inductors (51, 52, 510, 520) to the terminals of the supply voltage source, and said supply sources (+) terminal carrying voltage relative to the reference potential (0) is connected from one sub-partial amplifier (11) through an inductor (53, 540) to the supply input of a further sub-partial amplifier (12), and an additional inductor (540, 540') is connected between the supply source and the further sub-partial amplifier (12) or between the cable inner conductor and the supply terminal of said further sub-partial amplifier.

5. An intermediate amplifier according to claim 1, wherein said sub-partial amplifiers (11, 12) are arranged in separate chambers, and said chambers are mounted in further chambers which are insulated from said separate chambers relative to high frequency voltages.

6. An intermediate amplifier according to claim 5 wherein said further chambers have a common partition wall.

7. An intermediate amplifier according to claim 6, including a zero capacitance passage for the choked line is formed through the partition wall.

8. An intermediate amplifier according to claim 7, wherein inductances are at least in part formed as output-side short-circuited coaxial lines.

9. An intermediate amplifier according to claim 8, wherein each of said coaxial lines are connected such that the stray capacitance between outer conductor and inner chamber does not bridge the stub line.

10. An intermediate amplifier according to claim 6, wherein the passage through said partition is formed as a high electrical strength duct capacitor.

11. A remote line amplifier arrangement to be mounted between an input and output coaxial wave guide in which the outer conductors are electrically connected together comprising first and second amplifiers, a first capacitor connected between the inner conductor of said input coaxial wave guide and the input of said first amplifier, the output of said first amplifier connected to the input of said second amplifier, a second capacitor connected between the output of said second amplifier and the inner conductor of said output coaxial wave guide, a pair of different potential feed points for said first and second amplifiers, a first inductor connected between the inner conductor of said input coaxial wave guide and one of said feed points of said first amplifier, a second inductor connected between the second feed point of said first amplifier and the second feed point of said second amplifier, a third capacitor connected between the outer conductors of said input and output coaxial wave guides and said one feed point of said first amplifier, a fourth capacitor connected between the outer conductors of said input and output coaxial wave guides and one feed point of said second amplifier, a unilateral current device connected between said feed points of said first amplifier, and a third inductor connected between the inner conductor of said output coaxial wave guide and the second feed point of said first amplifier.

12. A remote line amplifier arrangement according to claim 11 including a fourth inductor connected between the first feed points of said first and second amplifiers.

* * * * *